US008135391B2

(12) United States Patent  
Scott et al.

(10) Patent No.: US 8,135,391 B2  
(45) Date of Patent: Mar. 13, 2012

(54) MOBILE DEVICE WITH ENHANCED TELEPHONE CALL INFORMATION AND A METHOD OF USING SAME

(75) Inventors: Sherryl Lee Lorraine Scott, Waterloo (CA); Lawrence Edward Kuhl, Waterloo (CA)

(73) Assignee: Research In Motion Limited, Waterloo (CA)

( * ) Notice: Subject to any disclaimer, the term of this patent is extended or adjusted under 35 U.S.C. 154(b) by 449 days.

(21) Appl. No.: 12/366,745

(22) Filed: Feb. 6, 2009

(65) Prior Publication Data

US 2010/0203874 A1    Aug. 12, 2010

(51) Int. Cl.  
*H04M 3/42* (2006.01)  
*H04B 7/00* (2006.01)

(52) U.S. Cl. ........................................ 455/415; 455/514

(58) Field of Classification Search .................. 455/466, 455/445, 414, 415, 412.1, 514, 566, 457; 379/354; 707/3; 370/352  
See application file for complete search history.

(56) References Cited

U.S. PATENT DOCUMENTS

| 6,687,362 | B1 | 2/2004 | Lindquist et al. | |
|---|---|---|---|---|
| 6,697,484 | B1* | 2/2004 | Fleming, III | 379/354 |
| 2003/0040304 | A1* | 2/2003 | Cox et al. | 455/414 |
| 2006/0234711 | A1* | 10/2006 | McArdle | 455/445 |
| 2007/0207782 | A1 | 9/2007 | Tran | |
| 2007/0225022 | A1* | 9/2007 | Satake | 455/466 |
| 2008/0102819 | A1 | 5/2008 | Bengtsson et al. | |
| 2008/0109408 | A1* | 5/2008 | Choi et al. | 707/3 |
| 2008/0208812 | A1* | 8/2008 | Quoc et al. | 707/3 |
| 2009/0280786 | A1* | 11/2009 | Ziklik | 455/415 |

FOREIGN PATENT DOCUMENTS

| DE | 100 27 523 A1 | 12/2001 |
|---|---|---|
| EP | 1 628 460 A | 2/2006 |
| WO | WO 99/55058 A1 | 10/1999 |
| WO | WO 2004/030326 A2 | 4/2004 |
| WO | WO 2004/049130 A2 | 6/2004 |
| WO | WO 2007/101878 A1 | 9/2007 |
| WO | WO 2008/094156 A1 | 8/2008 |

OTHER PUBLICATIONS

Extended European Search Report on EP Application No. 10162434.4 dated Jun. 9, 2010; 11 pages.  
EP Application No. 09152314.2-2414 EESR dated Sep. 10, 2009.

* cited by examiner

*Primary Examiner* — Kiet Doan  
(74) *Attorney, Agent, or Firm* — Ridout & Maybee LLP

(57) ABSTRACT

A mobile device with enhanced telephone call information and a method of using same are provided. In accordance with one embodiment, there is provided a method of providing enhanced phone call information on a mobile communication device, comprising: receiving an incoming call on the device; identifying a contact name in an address book stored in a memory of the device in accordance with a phone number associated with the incoming call when the contact name is not provided with the incoming call; identifying a contact name in a remote contact source in accordance with a phone number associated with the incoming call when the contact name is not provided with the incoming call and not found in the address book stored in a memory of the device; and displaying the identified contact name in a user interface screen on a display screen of the device.

24 Claims, 10 Drawing Sheets

MOBILE DEVICE WITH ENHANCED TELEPHONE CALL INFORMATION AND A METHOD OF USING SAME

TECHNICAL FIELD

The present disclosure relates generally to mobile communications and more particularly to a mobile device with enhanced telephone call information and a method of using same.

BACKGROUND

Mobile telephones and other mobile communication devices such as "smartphones" are increasingly provided with greater onboard information and greater access to wireless services and information. However, for the most part the information available to mobile telephones is not used to enhance telephone calls. For instance, when an incoming call is received from an unknown caller, mobile telephones typically provide no mechanism to identify the caller before answering the call. Similarly, when a telephone user is seeking to make an outgoing call from a phone application, mobile telephones typically require the user to input the telephone number or for the telephone number to be present in a local address book of the mobile telephone. Thus, there remains a need for mobile devices with enhanced telephone call information and methods of using the same.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
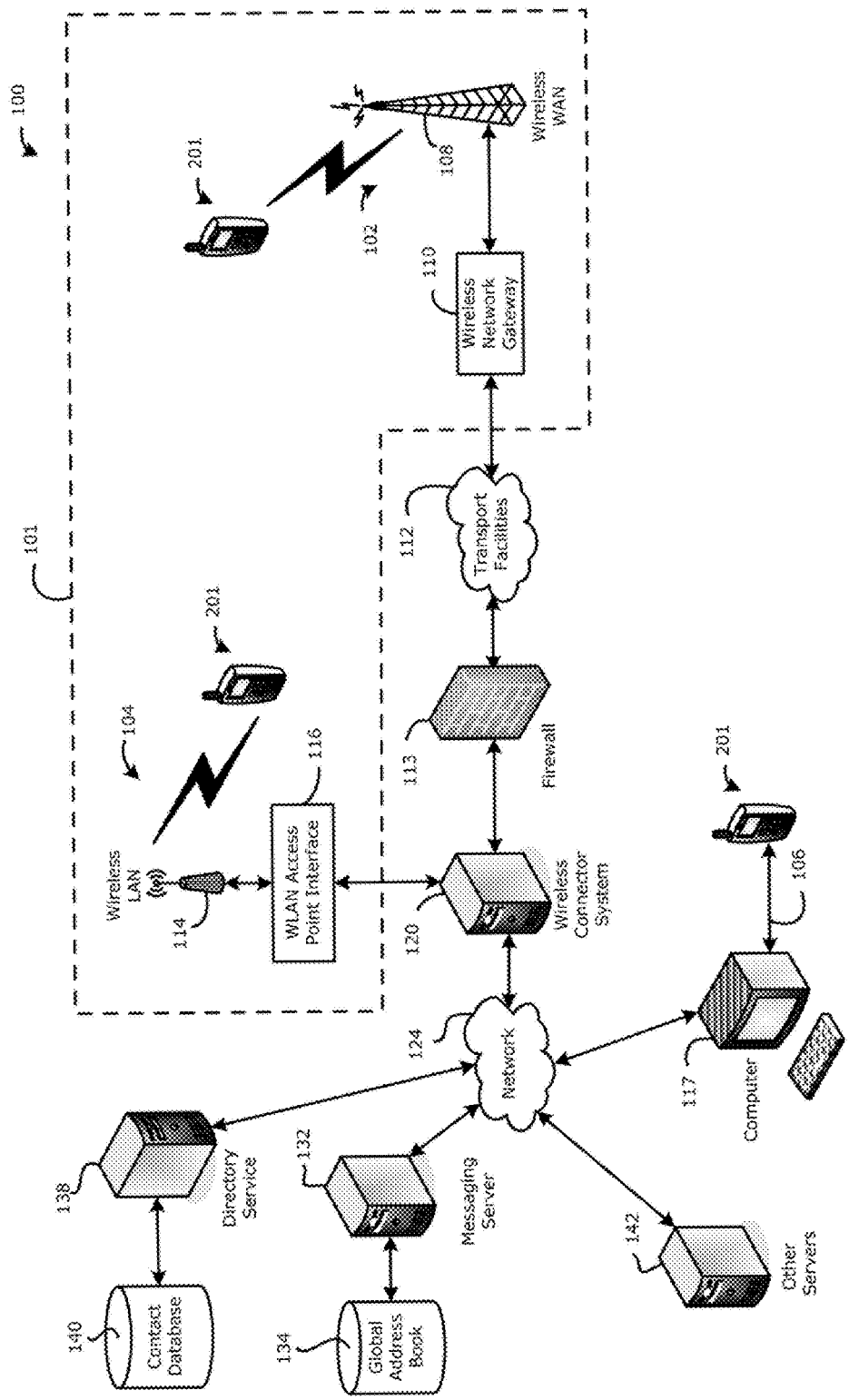
FIG. 1 is a block diagram illustrating a communication system including a mobile communication device to which example embodiments of the present disclosure can be applied.

The present disclosure provides, in some embodiments, a mobile device with a phone application having integrated reverse telephone number lookup for incoming calls and possibly forward telephone number lookup for making outgoing calls. In other embodiments, there is provided a mobile device with an email application having a directory service for email address lookups. Such phone applications and email applications may be implemented on the same mobile device for use in the appropriate context. Methods of using such mobile devices and communication systems which supports such devices and methods are also provided.

In accordance with one embodiment of the present disclosure, there is provided a method of providing enhanced phone call information on a mobile communication device, comprising: receiving an incoming call on the device; identifying a contact name in an address book stored in a memory of the device in accordance with a phone number associated with the incoming call when the contact name is not provided with the incoming call; identifying a contact name in a remote contact source in accordance with a phone number associated with the incoming call when the contact name is not provided with the incoming call and not found in the address book stored in a memory of the device; and displaying the identified contact name in a user interface screen on a display screen of the device.

In accordance with another embodiment of the present disclosure, there is provided a method of providing enhanced phone call information on a mobile communication device, comprising: displaying a dialing user interface screen on a display screen of the device, the dialing screen including a dialing field; receiving input via the dialing field; determining if a contact name in an address book stored in a memory of the device matches the input in the dialing field; determining if a contact name in a remote contact source matches the input in the dialing field in response to respective input; and displaying one or more contact names which match the input in the dialing user interface screen.

In accordance with a further embodiment of the present disclosure, there is provided a method of providing enhanced email information on a mobile communication device, comprising: displaying an email composition user interface screen on a display screen of the device, the email composition user interface screen including at least one address field; receiving text input via the address field; identifying a contact name in an address book stored in a memory of the device in accordance with the text input; identifying a contact name in a remote contact source in accordance with the text input in response to respective input; and displaying one or more identified contact names in the email composition user interface screen.

In accordance with a further embodiment of the present disclosure, there is provided a method of providing enhanced contact information on an electronic device, comprising: displaying a user interface screen of an application on a display screen of the electronic device, the user interface screen including a contact input field; receiving input via the contact input field; determining if a contact name in an address book stored in a memory of the device matches the input in the contact input field; determining if a contact name in a remote contact source matches the input in the contact input field; and displaying one or more contact names which match the input in the user interface screen. The electronic device may be a mobile communication device such as a handheld communication device. The user interface screen may be for a communication application which, in some embodiments, could be a text messaging application for sending SMS, MMS or other text messages, an instant messaging (IM) application, chat application, or a personal address book. In some embodiments in which the application is an email messaging application, the user interface screen is an email composition user interface screen and the contact input field is an address field of the email composition user interface screen. In some embodiments, the remote contact source is only checked to determine if any contact names match the input in the contact input field in response to respective input. In some embodiments, the contact names are displayed together in a pop-up window which overlays at least a portion of the email composition user interface. In some embodiments, the remote contact source is a directory service. In some embodiments, two or more remote contact sources are searched, the remote contact sources comprising (i) a global address book of a messaging server of a wireless connector system associated with the device and (ii) a directory service.

In accordance with yet further embodiments of the present disclosure, there are provided mobile communication devices, comprising: a controller for controlling the operation of the device; a display screen connected to the controller; a communication subsystem connected to the controller configured for data and/or voice communication with a wireless network; one or more input devices connected to the controller; the controller being configured to perform the methods described herein.

In accordance with yet further embodiments of the present disclosure, there is provided a messaging server and directory service for performing lookup operations described herein. In accordance with yet further embodiments of the present disclosure, there is provided a system comprising at least a mobile communication device and one or more of a messaging server and directory service for performing lookup operations described herein. In accordance with yet further embodiments, there are provided computer program products comprising a computer readable medium carrying thereon executable program code for controlling the above-mentioned electronic devices, the executable program code causing the electronic devices to perform the methods described herein.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line of FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server) having a global address book 134, a directory service 138 having a contact database 140, and other servers 142 such as a content server for providing content such as internet content or content from an organization's internal servers and an application server for implementing server-based applications such as instant messaging (IM) applications to mobile communication devices 201. While only one directory service 138 is shown, it is contemplated that several directory services 138 may be connected to the network 124 in some embodiments.

The global address book 134 comprises electronic contact records created and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The directory service 138 is implemented by a server which may or may not be part of the network 124. The directory service 138 may be maintained by an individual or enterprise for profit or made freely available. In some embodiments, the directory service 138 may be a proprietary contact directory provided by the enterprise which manages the network 124 which is separate from the messaging server 132. The directory service 138 maintains a contact database 140 which comprises electronic contact records for one or both of individuals and organizations (such as businesses).

The contact database 140 comprises at least a name and telephone phone number, and possibly other contact information such as one or more of a street address, email address, Skype™ address, IM address or identifier, SIP URI (Session Initiation Protocol Uniform Resource Identifier), and other contact information or personal details which may be stored in a "notes", "details" or equivalent field storing so-called "extended" contact information. The contact database 140 may be provided by, or be based on information from, publicly listed records from wired telephone carriers (e.g., Plain Old Telephone Service (POTS) carriers), Voice-Over-IP (VOIP), or wireless telephone carriers. The contact database 140 may be supplemented with, provided by, or based on contact information provided by alternative contact information sources which may provide more detailed contact information such as social networking services, business directory services, and the like. Typically, the contact information provided by such alternative contact information sources requires the consent of the respective individual or organization (e.g. businesses) before contact information is made available to the directory service 138. The directory service 138, in at least some embodiments, provides reverse lookup functionality.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132, content server 132 or application servers 136 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
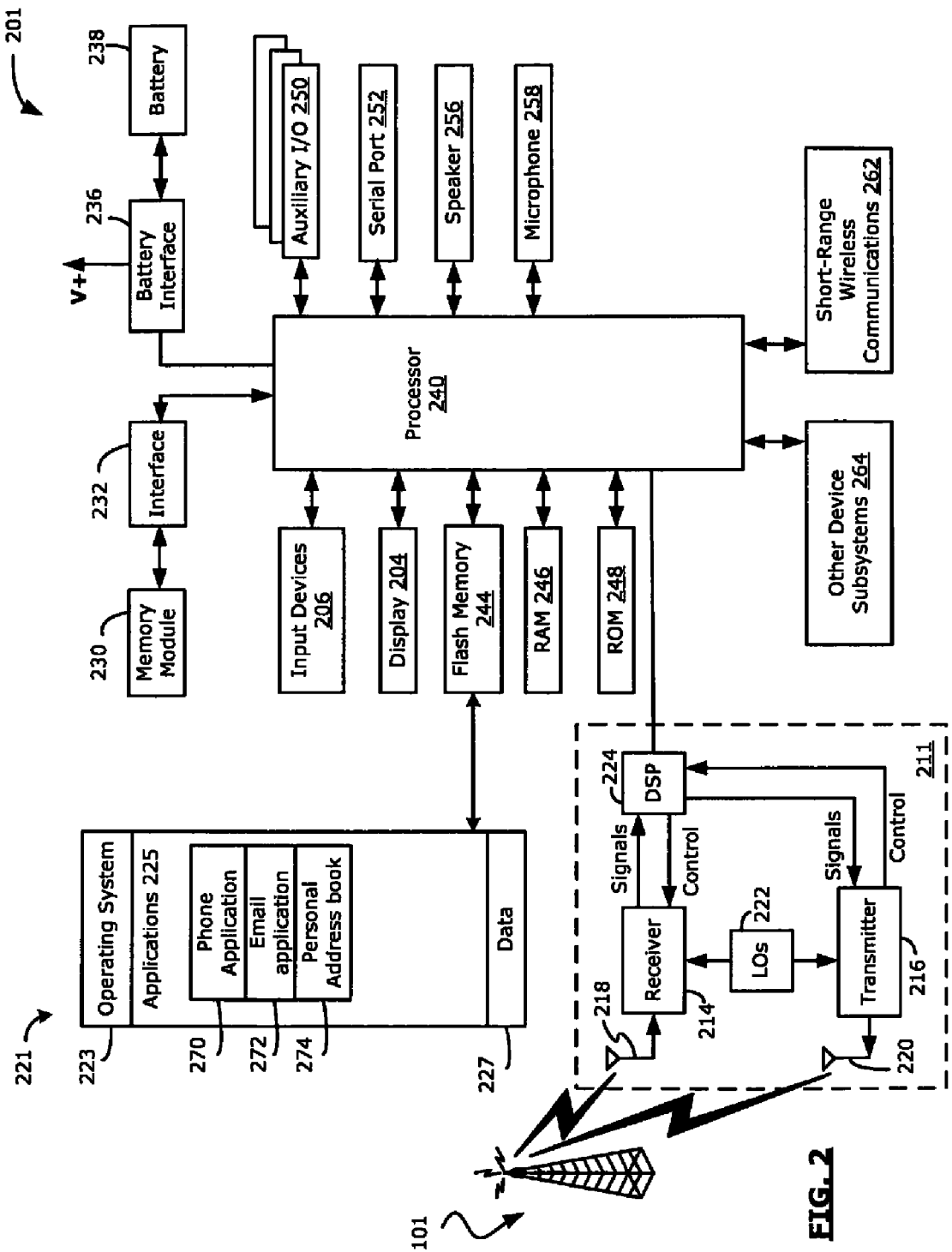
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a communication subsystem 211 for exchanging radio frequency signals with the wireless network 101 to perform communication functions. The processor 240 interacts with additional device subsystems including a display (screen) 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising a phone application 270, an email messaging application (email application) 272, and a personal address book 274.

The personal address book 274 comprises electronic contact records created by the device user which are stored on the mobile device 201 in memory 244, and possibly in memory of the messaging server 132. A "local" copy of the personal address book 274 on the mobile device 201 may be synchronized with a "network" or "enterprise" copy maintained by the messaging server 132 so that the personal address book 274 may be accessed by the device user on either the mobile device 201 or an enterprise computer 117, or another computer with remote access to the network 124.

The phone application 270, email application 272, and personal address book 274 may, among other things, be implemented through a stand-alone software application, or combined together in one or more of the operating system 223 and applications 225. In some example embodiments, the functions performed by each of the phone application 270, email application 272, and personal address book 274 may be realized as a plurality of independent elements, rather than single integrated elements, and any one or more of these elements may be implemented as parts of other software applications 225.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display screen 204) according to the application.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic communication or incoming phone call, or for other purposes such as haptic feedback (touch feedback).

In some embodiments, the mobile device 201 also includes a removable memory card 230 (typically comprising flash memory) and a memory card interface 232. Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 stores data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application 272 and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 3A:
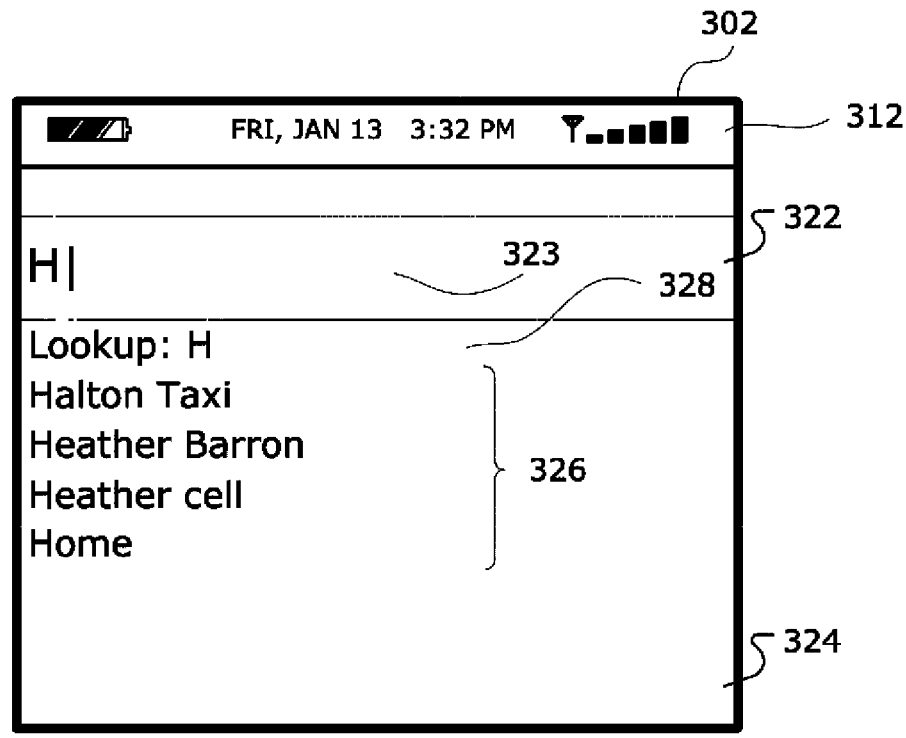
FIG. 3A-E illustrate example dialing user interface screens for a phone application for a mobile device in accordance with one example embodiment of the present disclosure.

FIG. 3A illustrates a first dialing user interface screen 302 for the phone application 270 on the mobile device 201 in accordance with one embodiment of the present disclosure. The dialing screen 302 includes a dialing field 322 for entry of an input comprising a telephone number or contact name of a party to be called. The dialing field 322, in at least some embodiments, is the active field of the dialing screen 302 when it is invoked (i.e., it is the default active field). A text cursor 323 (sometimes referred to as a caret) is provided within the dialing field 322. The text cursor 323 is an onscreen indicator used to show a position on the display 204 which responds to text input and navigational input from the input and navigational input devices of the device 201, respectively. As will be appreciated by persons skilled in the art, text input via the respective input devices will cause the processor 240 to display corresponding text at the position of the cursor 323, and navigational input from respective navigational input devices will cause the processor 240 to move the text cursor 323 within the dialing field 322 or between selectable fields of the dialing screen 302.

In the shown embodiment, the dialing screen 302 also includes a status bar 312 which displays information such as the current date and time, icon-based notifications, device status and/or device state. While the status bar 312 is shown at the top of the dialing screen 302 in the illustrated embodiment, in other embodiments the status bar 312 may be located elsewhere such as at the bottom of the dialing screen 302 or may be omitted. The status bar 312 is typically non-selectable.

The dialing field 322, in at least some embodiments, concurrently interprets both letter and number text inputs. In some embodiments, inputs in the dialing field 322 will be interpreted as numbers in a phone number for direct dialing unless a key outside of a number area of the keyboard is depressed (i.e., unless a key which is not associated with a number is depressed). For example, some mobile devices have full keyboards in which some keys are associated with a number and one or more letters, and some keys are associated with one or more letters but no number (but, possibly, a symbol or function or other input). In such embodiments, the dialing field 322 may interpret both letter and number inputs as possibilities until there is a sufficient number of characters input to determine whether a telephone number or contact name is being input into the dialing field 322.

In some embodiments where the keys of the mobile device have at least one number and at least one letter, the dialing field 322 prefers numbers to letters and interprets all characters input in the field 322 as numbers until a key which is not associated with a number (e.g., a letter key) is depressed. In other embodiments, the dialing field 322 could prefer letters to numbers with the opposite result.

In yet other embodiments, the dialing field 322 could interpret all inputs as alphanumeric inputs. That is, all numbers and letters associated with the depressed keys are considered as possibilities. In some embodiments, this alternative mode can be initiated using the key combination of ALT+letter in the dialing field 322. This key combination instructs the dialing field 322 and telephone application 270 that the input comprises numbers and letters, i.e. "1800BLACKBERRY". Alternatively, in yet other embodiments the alternative mode could be initiated using a menu option via corresponding interaction with a menu of the user interface, or could be initiated using a "hot key" (a predefined key which triggers an alternative function when held down for a predetermined duration).

The manner in which the dialing field 322 interprets inputs may be based on a preference setting on the mobile device and may be changed by the user during use, for example, by using a predetermined key combination while the dialing field 322 is active. That is, the user can switch between any two or more of the described input modes of the dialing field 322 based on corresponding input. Touchscreen-based devices having a similarly configured virtual keyboard may operate in a similar fashion when corresponding virtual keys are activated.

The dialing screen 302 also includes a contact window 324 which displays a list of contacts 326 which match the input in the dialing field 322. The number of contacts 326 which match the input in the dialing field 322 may exceed the number of references which can fit within the window 324. In such cases, the contact window 324 may be scrollable so that contact records which are not shown in the contact window 324 can be displayed and reviewed by the device user. A scroll bar (not shown) may be provided as an indication of the availability of scrolling, as well as providing a scrolling mechanism and an indication of the relative size of the list of contacts 326.

The phone application 270 performs a local lookup operation in which the input of the dialing field 322 is compared to electronic contact records in a personal address book 274 stored in memory 244. As the input in the dialing field 322 changes (e.g., more characters are added or characters are removed or changed), the phone application 270 re-compares the input in the dialing field 322 to the electronic contact records in the personal address book 274 to dynamically generate the list of contacts 326 based on the input in the dialing field 322. As noted above, the personal address book 274 comprises electronic contact records each comprising one or more fields. The personal address book 274 is created by the device user and stored in the memory 244 of the mobile device 201, and possibly in memory of the messaging server 132. The "local" copy of the personal address book 274 on the mobile device 201 may be synchronized with a "network" or "enterprise" copy maintained by the messaging server 132.

The contact window 324 also includes a lookup field 328 for performing a lookup of one or both of a global address book 134 (also referred to as a network or enterprise address book) and a directory service 138, depending on the embodiment and the services available to the network 124. As noted above, the global address book 134 comprises electronic contact records each comprising one or more fields. The global address book 134 is created and maintained by an IT administrator of the network 124. Typically, the global address book is maintained exclusively by the messaging server 132 and there is no local copy on the mobile device 201. The directory service 138 maintains a contact database 140 which comprises electronic contact records each comprising one or more fields for one or both of individuals and organizations (such as businesses).

The lookup field 328, in at least some embodiments, is automatically populated with the input from the dialing field 322 (the input "H" is illustrated in FIG. 3A). In some embodiments, the lookup field requires input to perform a lookup operation. That is, while the input from the dialing field 322 is automatically populated in the lookup field 328, the lookup operation itself is not performed without input to perform the operation. In some embodiments, the user can change the active field to be the lookup field 328 by corresponding navigational input via the navigational input device, for example by moving a scroll wheel or trackball downwards towards the lookup field 328 from the dialing field 322, or using corresponding directional input via a touchscreen. In other embodiments, the input of the lookup field 328 must be input directly via respective user input.

Figure 3B:
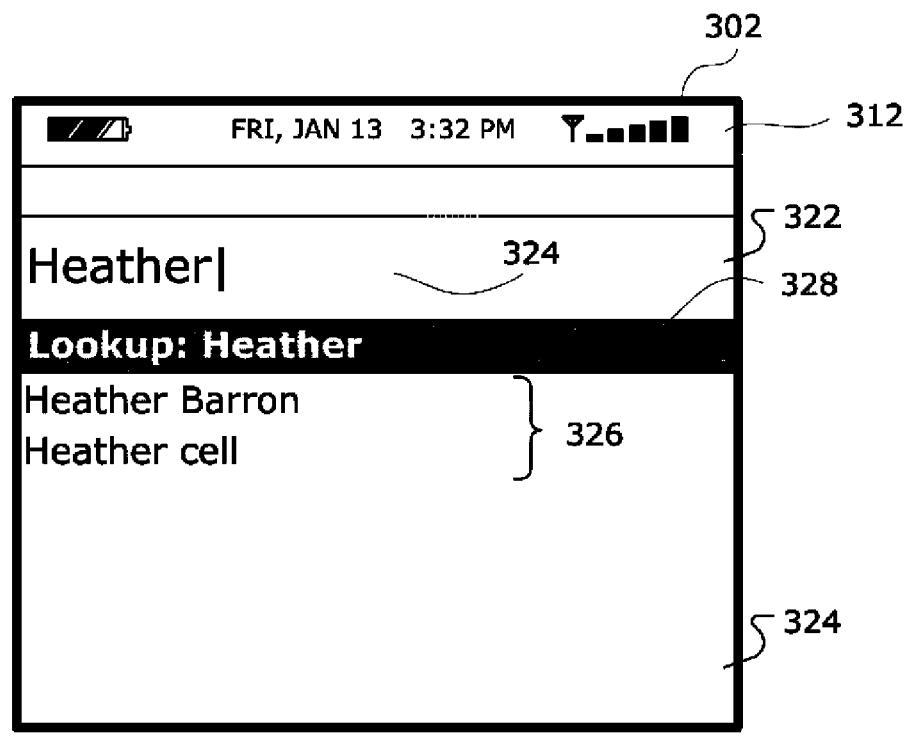

FIG. 3B illustrates a second dialing screen 302 similar to the display screen in FIG. 3A, except that the lookup field 328 is now the active field and more input characters have been added to the dialing field 322 (the contact name "Heather" is now input as illustrated in FIG. 3B). An indication that the lookup field 328 is the active field is provided by highlighting the lookup field 328. In the shown embodiment, highlighting comprises changing the colour of the background and the colour of the text of the lookup field 328. In particular, the colour of the background is changed to blue (from white) and the colour of the text is changed to white (from black). In other embodiments, only one of the background colour and text colour may be changed. In other embodiments, different colours may be used as the default background colour and text colour, and different colours may be used as the highlighted background colour and text colour.

In some embodiments, activating or selecting the active (highlighted) lookup field 328 instructs the mobile device 201 to perform a lookup operation on the input in the lookup field 328 (the contact name "Heather" in FIG. 3B) in the global address book 134 and/or using the directory service 138.

In performing the lookup operation, the mobile device 201 may query one or both of the global address book 134 of the messaging server 132 or the contact database 140 of the directory service 138 depending on the system configuration and the settings. When performing a lookup of the global address book 134, the mobile device 201 contacts the messaging server 132 and requests that it compare the lookup field input to the contact records in the global address book 134, determine which contact records match the lookup field input, and return contact information to the mobile device 201 about the contact records in the global address book 134 which match the lookup field input. The comparison may be based on one or more of the fields of the contact records in the global address book 134. The comparison is typically based on at least the name field of the contact records, but could also be performed on other fields of the contact records such as organization/company.

When performing a lookup of the contact database 140 of the directory service 138, the mobile device 201 contacts directory service 138 and requests that it compare the lookup field input to the contact records in the contact database 140, determine which contact records match the lookup field input, and return contact information to the mobile device 201 about the contact records in the contact database 140 which match the lookup field input. The comparison may be based on one or more of the fields of the contact records in the contact database 140. The comparison is typically based on at least the name field of the contact records, but could also be performed on other fields of the contact records such as organization/company.

The directory service 138 may be a reverse lookup (directory) service or reverse lookup such as 411.com or 411.ca, any other address/directory service for individual, businesses or both. The directory service is preferably a telephone directory service for telephones (whether cellular, POTS landline or VOIP phones), but may be any other business or individual contact directory maintaining a listing of individuals and/or business having at least name and telephone numbers.

Figure 3C:
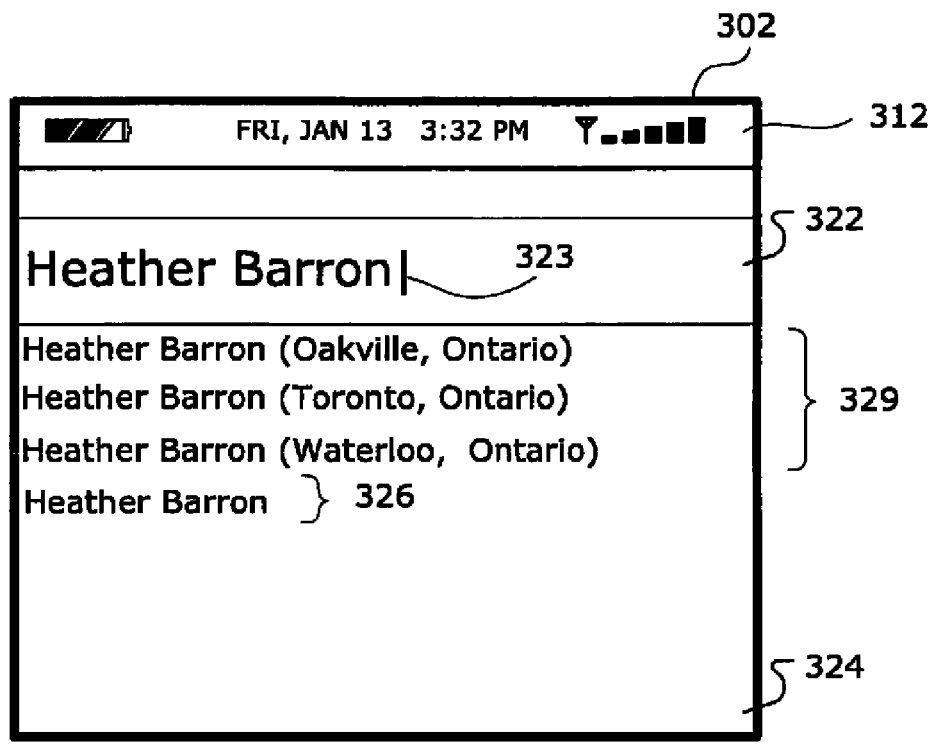

As seen in FIG. 3C, the returned contact information 329 from the messaging server 132 and/or directory service 138 comprises at least the name and telephone number of the matching records, and possibly supplemental information such as a department or title, company or organization, address or other contact information. The returned contact information 329 may be in the form of contact records, which may be a reduced or optimized format of the contact records in the global address book 134 or contact database 140 which is suitable for and compatible with the personal address book 274. Alternatively, the returned contact information 329 may be the same format as that in the global address book 134 or contact database 140, or may be unformatted (e.g., plain text) information.

In some embodiments, the returned contact information 329 may be added to the personal address book 274 via respective user input. The returned contact information 329 may create a new contact record if one already exists in the personal address book 274, replace the existing contact record, or update the existing contact record to include the new or different information. A prompt may be provided when a contact record already exists in the personal address book 274. The prompt requests user input as to which one of any two or more of following operations should be performed: replacing the contact record; updating the contact record; adding a new contact record; cancelling the operation.

Figure 3D:
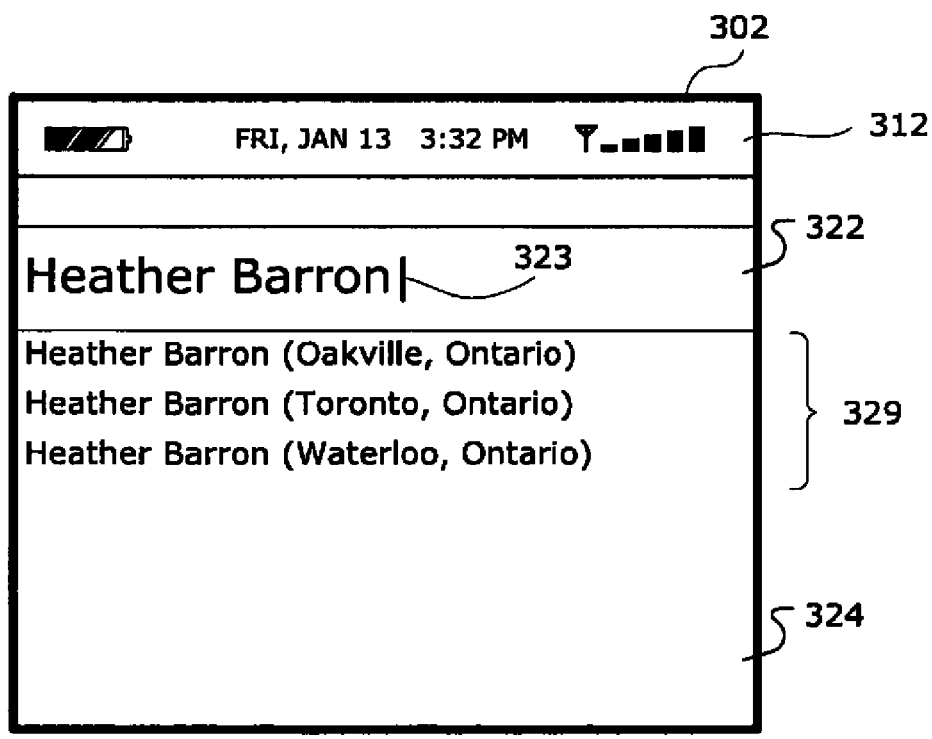

The name 408 (FIG. 4) and possibly additional contact information returned from the remote lookup operation is displayed in the contact window 324. FIGS. 3C and 3D illustrates two different embodiments of a dialing screen 302 with returned contact information 329 from a remote lookup operation. FIG. 3C illustrates the returned contact information 329 in the contact window 324 in combination with the list of contacts 326 from the personal address book 324. FIG. 3D illustrates the returned contact information 329 in the contact window 324 on its own without the list of contacts 326 from the personal address book 324. In both FIGS. 3C and 3D, additional contact information in the form of a location of the contact is displayed (in the form of city, province/state in the shown embodiment). In other embodiments, other or different additional contact information, or no additional contact information may be used. The additional contact information provides additional information from which the user can select from the contact information returned from the lookup operation of the remote/external contact sources.

In some embodiments, the returned contact information 329 may include an indication of the source of the contact information, for example as being either from the personal address book 274 or a remote contact resource, or providing an indication of whether the source is the personal address book 274, global address book 134 or contact database 140. The indication may be provided by any suitable means such as a text label and/or by using a suitable colour coding scheme for the background and/or text of the respective fields. In some embodiments, each contact name is highlighted with a different colour which represents the source of the contact name. One colour may be used to highlight contact names from the personal address book 274 so that the user knows the contact is already a stored contact and there is no need to add the contact to the personal address book 274. A different colour may be used to highlight contact names from the remote contact sources, possibly using a different colour for the global address book 134 and contact database 140.

Figure 3E:
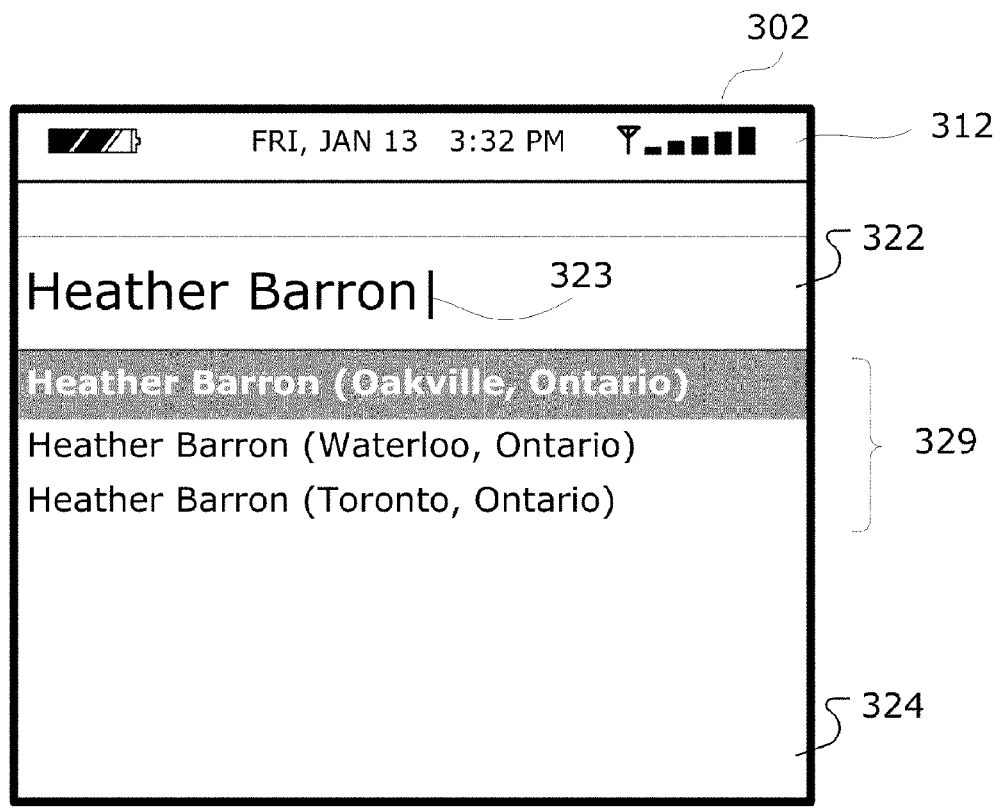

From the user interface screens of either FIG. 3C or 3D, the user can select a contact record in the contact window 324 as the active field by corresponding navigational input via the navigational tool, for example by moving a scroll wheel or trackball downwards towards the desired field, or using corresponding directional input via a touchscreen. Activating or selecting the active (highlighted) contact record from the contact window 324 instructs the mobile device 201 to initiate an outbound call to the respective contact. FIG. 3E illustrates the selection of the contact "Heather Barron" of Oakville, Ontario from the screen of FIG. 3D. A contact could also be selected from the dialing screen of FIG. 3C in a similar manner. In other embodiments, the contacts could be listed with a corresponding number beside or otherwise associated with the displayed contact names. The phone application 270 is configured so that the phone number associated with a displayed contact name can be selected and dialed by depressing the number key for the number of one of the displayed contact names. For example, the following could be presented in the contact window 324:

1. Donna MacDonald
2. Donna MacDonn
3. Donna MacDono
4. Donna MacDonz
5. Donna Nice Depressing the "5" key (which could be shared with one or more letters and/or other inputs) in the keyboard would initiate a selection of a contact Donna Nice in the contact list 326 and dial the telephone number for that contact.

In some embodiments, if the mobile device 201 has a GPS subsystem (for example, as part of the auxiliary I/O subsystems 250), upon receiving an instruction to perform an external lookup operation the mobile device 201 may determine its current location using the GPS subsystem and send the location information to the messaging server 132 and/or directory service 138 with the input of the lookup field 328 to be used in combination when determining which contacts in the global address book 134 and contact database 140 match. That is, the location information is used as a secondary criteria or filter. The location information is compared to address information about the contacts in the global address book 134 and/or contact database 140 so that only contacts in the same location of the mobile device 201 are selected and returned. The criteria for "same location" could be the same city, same state or province, or within a predetermined distance from the current location for the mobile device 201, for example within 40 km. The city associated with the contact may be a convenient and easy to use criterion for determining whether the contact record matches the location of the mobile device 201. The criteria may be definable and/or selectable by the user.

It will be appreciated that the above described embodiments reduce data charges by performing remote lookup operations only when requested based on user input. In other embodiments, the remote lookup operation may be performed automatically without user input while the user enters input in the dialing field 322. This increases the amount of contact information available to the user before making an outgoing call; however, this requires performing the requisite mobile data access before each call. In such embodiments, the returned contact information 329 may be displayed in the contact window 324 in combination with the list of contacts 326 from the personal address book 274 similar to the dialing screen shown in FIG. 3C.

Figure 7:
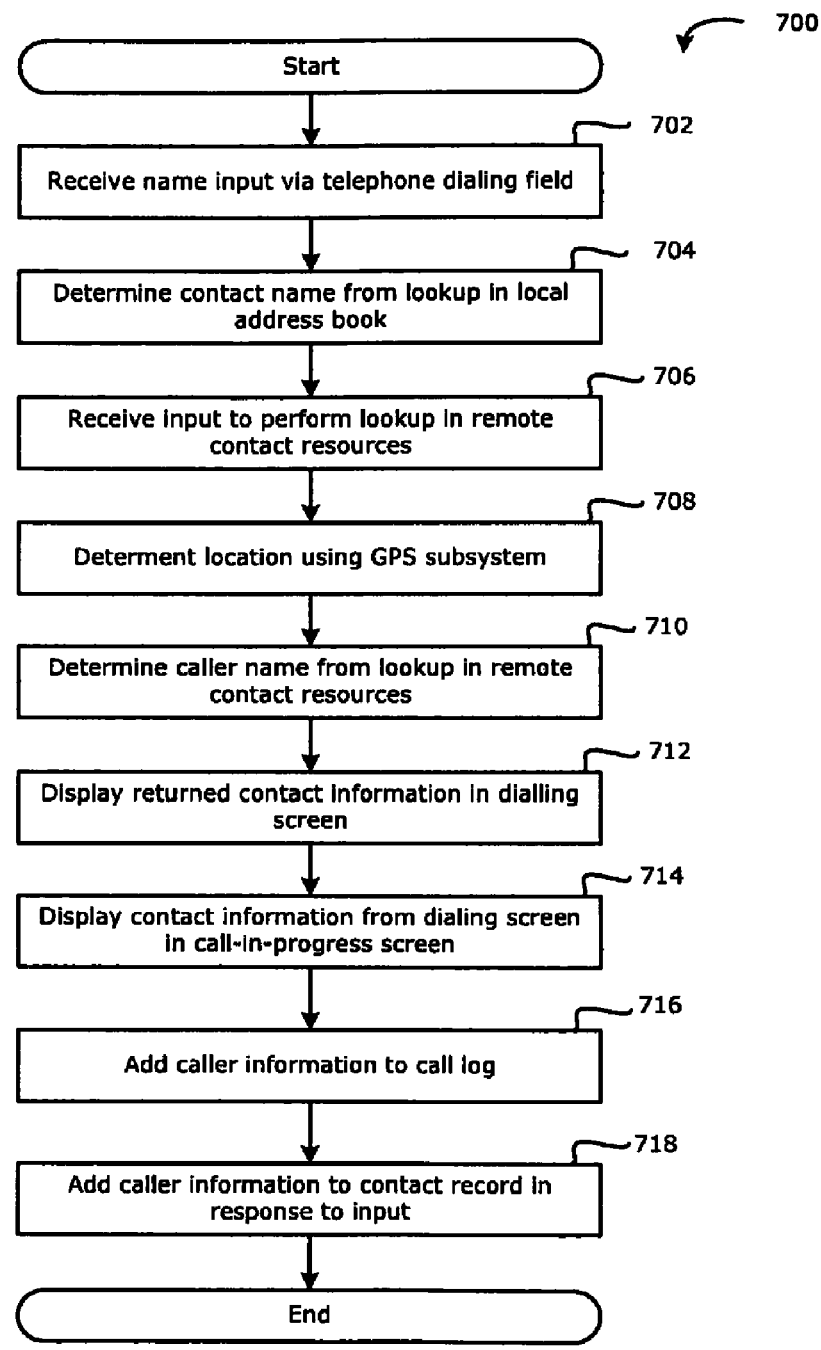
FIG. 7 is a flowchart illustrating example method of providing enhanced telephone call information for an outgoing call in accordance with one example embodiment of the present disclosure.

Referring now to FIG. 7, an example method of providing enhanced telephone call information for an outgoing call in accordance with one example embodiment of the present disclosure will be described. Operations 700 of the method are carried out by the processor 240 of the mobile device 201 under the instruction of the phone application module 270 when the phone application is the active application on the device 201. The dialing screen 302 shown above is the main (default) screen of the phone application 270 when invoked when there is no incoming call.

The phone application 270 receives an input in the dialing field 322 (step 702) via respective input via one or more input devices. The phone application 270 populates the lookup field 328 with the input of the dialing field 322 and performs a local lookup operation of the personal address book 274 (step 704) using the lookup field input as the search term. The contact information about contact records in the personal address book 274 which match the search term are then displayed in the contact window 324 (see, for example, FIG. 3A).

Next, the phone application 270 receives an input request to perform a remote lookup operation on the input of the lookup field 328 (step 706). Optionally, in some embodiments, if the mobile device 201 has a GPS subsystem the mobile device 201 determines its current location using the GPS subsystem (step 708). As noted above, in other embodiments the remote lookup operation may be performed automatically without user input while the user enters input in the dialing field 322 in the same manner as with the personal address book 274.

Next, a lookup operation of the remote contact sources (i.e., the global address book 134 and/or contact database 140) is performed (step 710). As described, this step comprises the processor 240 instructing the messaging server 132 and/or directory service 138 to perform a lookup of the respective contact information stores. The instructions include at least the input in the lookup field 328 as the basis for the search/lookup. If the mobile device 201 has a GPS subsystem and the mobile device 201 determined its current location using the GPS subsystem in step 708, the instructions also include the location information. Other sources of location information such as triangulation via base stations 108 or location services may be used in other embodiments.

Next, the remote contact sources, i.e. the messaging server 132 and/or directory service 138, perform a lookup operation using the lookup field input and optionally location information as search terms. The remote contact sources then determine which contact records match the lookup field input and optionally location information.

Next, contact information from contact records in the global address book and/or contact database 140 which match the search criteria are returned to the mobile device 201. The returned contact information 329 is then displayed in the contact window 324, typically with the list of contacts 326 from the personal address book 274 (step 712).

It will be appreciated that more than one contact name can be found. The multiple contact names can come from the personal address book 274, the remote contact sources, or both. When multiple contact names are identified from the personal address book 274 and/or remote contact sources, the multiple contact names are displayed in an order selected in accordance with a predetermined rule. The predetermined rule may be that the contact names are displayed in descending order based on the closest match (based on name comparison), based on the most commonly used (based on a usage log maintained by the mobile device), or other basis. A preference setting may also be provided for the user to specify his or her preferences.

When an outgoing call is placed by selecting a contact from the contact window 324, for example from the list of contacts 326 from the personal address book 274 or returned contact information 329, and corresponding input to place a call to the selected destination number, the outgoing call is initiated and a calling user interface screen (not shown) is displayed on the display screen 204 (step 714). The input to place a call to the highlighted/selected contact may be depressing a "call" or "dial" button (not shown) or causing a phone application menu to appear and selecting a menu item requesting the mobile device to place a call to the highlighted/selected contact. The calling user interface screen is similar to the incoming-call screen 402 (shown in FIG. 4) with a different notification in the notification field 403 (i.e., including a notification in the notification field that an outbound call is in-progress such as the text "Calling"), and includes call information in a call information field 404 which comprises at least the telephone number 406 and name 408. When the contact is from the returned contact information 329, the telephone number 406 and name 408 are that obtained from the remote contact sources.

Next, the caller information is optionally added to the call log (step 716). This step is optional and need not be performed in all embodiments.

Next, the caller information is optionally added to the personal address book (step 718), typically in response to corresponding user input, such as causing a phone application menu to appear and selecting a menu item requesting the mobile device to add the contact to the personal address book 274. This step is optional and need not be performed in all embodiments.

It will be appreciated that in the operations 700 contact information is only returned to the phone application 270 when a phone number is defined for a contact record regardless of whether other contact information such as the contact name matches the search terms used in the lookup. This applies to both local lookup operations and remote lookup operations.

Figure 4:
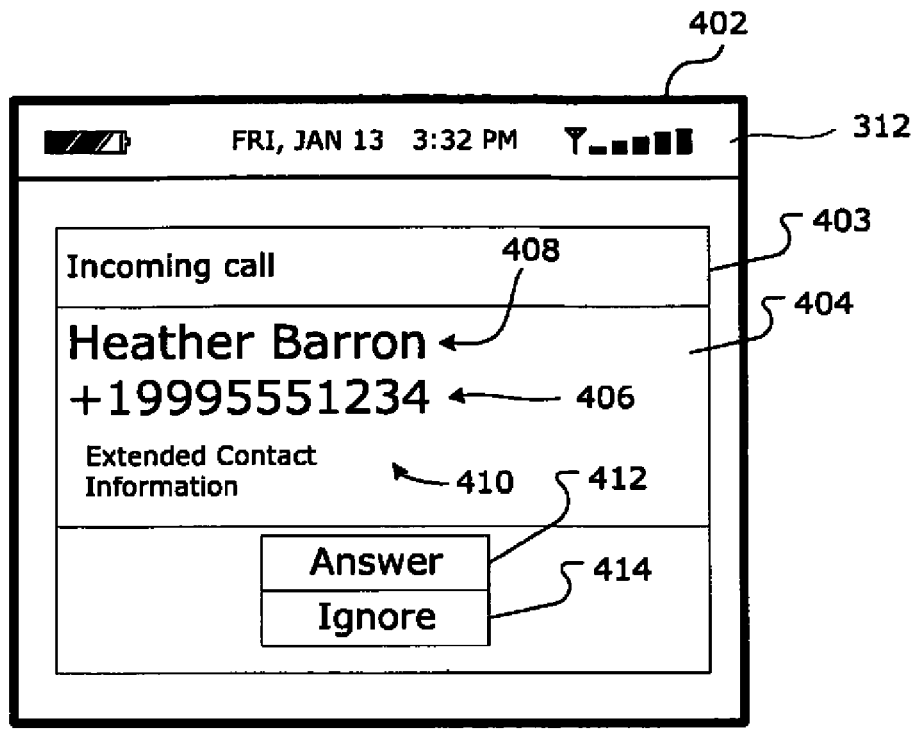
FIG. 4 illustrates an incoming call user interface screen for a phone application for a mobile device in accordance with one embodiment of the present disclosure.

FIG. 4 illustrates an incoming call user interface screen 402 for the phone application 270 on the mobile device 201 in accordance with one embodiment of the present disclosure. The incoming call screen 402 includes a notification field 403 which provides a notification that there is an incoming call and a call information field 404 which includes a telephone number 406 (1-999-555-1234 in the shown screen) and a name 408 (Heather Barron in the shown screen) associated with the incoming call. As will be appreciated by person skilled in the art, the incoming phone number 406 is provided by the carrier associated with the number and passed to the wireless network 101 where it is included in the radio layer.

When an incoming call is received on the mobile device 201, the incoming phone number 406 is provided to the mobile device 201 in the radio layer by the wireless network 101. If call identification (ID) blocking has been applied to the incoming call by the caller, the mobile device 201 is prevented from displaying the telephone number or using the telephone number, in which case no telephone number or name are displayed. Typically, the mobile device 201 is configured not to display the telephone number when caller ID blocking is in effect to comply with legal requirements rather than being technically incapable of doing so. When incoming call name is private or not known, or when call ID blocking has been applied to the incoming call, "Private", "Private Name" or similar text may be displayed in the incoming call user interface screen 402.

The name of the caller may be omitted from the radio layer for one or more of several reasons which are not relevant to the present disclosure. In some embodiments, the processor 240 under the instructions of the phone application 270 performs a lookup in the personal address book 274 when no name is provided with the incoming call. Alternatively, in other embodiments a lookup may be performed on the personal address book 274 regardless of whether a name is provided with the incoming call. These embodiments allow contact information in the personal address book 274 to override any name provided with the incoming call so that the displayed name 408 matches personal preferences of the device user as evidence by the name in the contact record.

The lookup comprises comparing the telephone number 406 provided with the incoming call (e.g., in the radio layer) to phone numbers stored in the contact records of the personal address book 274. When a contact record which matches the telephone number 406 is found in the personal address book 274, the corresponding name of a contact record is displayed in the incoming call screen 402, possibly along with extended contact information 410 (i.e., contact information in addition to the phone number 406 and name 408).

As described above, the extended contact information 410 may comprise any one or more of a street address, email address, Skype™ address, IM address or identifier, SIP URI, or other contact information or details. The extended contact information 410 may be obtained from the personal address book 274, or from the global address book 134 or contact database 140 maintained by the directory service 138 in response to a remote lookup described below.

In some embodiments, when there is no matching record in the personal address book 274, a remote lookup is performed on one or both of the global address book 134 maintained by the messaging server 132 and the contact database 140 maintained by the directory service 138. The directory service 138 used in combination with an incoming call is typically a reverse lookup (directory) service such as www.411.com or www.411.ca, etc.). In some embodiments, a remote lookup is performed on the global address book 134 only when there is no matching record in the personal address book 274. Only when there is no matching record in the global address book 134, a remote lookup is performed on the contact database 140 maintained by the directory service 138.

As with lookups performed from the dialing screen 302, when performing a lookup in response to an incoming call, the mobile device 201 contacts messaging server 132 and/or directory service 138 and requests that it compare the telephone number 406 to the contact records in the global address book 134 and contact database 140 respectively, determine which contact records match the telephone number 406, and return contact information to the mobile device 201 about the contact records in the global address book 134 and/or contact database 140 which match the telephone number 406. The comparison may be based on one or more of the telephone fields of the contact records.

In some embodiments, the remote contact sources (i.e., the global address book 134 and/or contact database 140) may be used to supplement, verify or update contact information provided with the incoming call (e.g., in the radio layer) and/or personal address book 274. In some embodiments, when the name 408 is available from the radio layer and/or personal address book 274, the remote contact sources are accessed to obtain additional contact information about the caller which may be displayed in the extended contact information 410. In such embodiments, the remote lookup may be performed using one or both of the phone number 406 and name 408. The types of missing information which triggers a remote lookup may be stored as a setting on the device 201 or wireless connector system 120.

In some embodiments, the additional contact information is obtained from the remote contact sources when one or more predetermined types of extended contact information 410 are not provided with the incoming call or in the personal address book 274. For example, the additional contact information may be obtained when one or more predetermined fields of the corresponding contact record in the personal address book 274 are empty. For example, if the contact record for the caller in the personal address book 274 does not include an email address, a lookup may be performed on the global address book 134 and/or contact database 140 to obtain the email address from one of those resources, if available. The operations can be performed when any predetermined type of contact information is missing from the contact records in the personal address book 274.

As above, the returned contact information from a remote lookup may be added to the personal address book 274 via respective user input.

It will be appreciated that performing a lookup of the global address book 134 or contact database 140 maintained by the directory service 138 consumes battery power (via accessing the radio, etc.), memory and processing resources, and typically incurs data transmission charges. The above-described embodiments describe alternatives which reduce the number of lookups performed on the global address book 134 and using the directory service 138 by performing lookups on these external resources only when the caller name is not provided with the incoming call (e.g., in the radio layer) and is not present in the local personal address book 274. Reducing the number of lookups performed on the global address book 134 and/or contact database 140 of the directory service 138 reduces the constraints imposed on device resources, but at the expense of access to additional contact information.

In other embodiments, lookups may be automatically performed on the global address book 134 and/or contact database 140 of the directory service 138 for each incoming call. In yet other embodiments, lookup settings on the mobile device 201 or the wireless connector system 120 may by used by the lookup module 280 to determine whether to perform a lookup on the global address book 134 and/or the contact database 140 of the directory service 138 for each incoming call, or whether lookups are to be performed only when the name 408 or other contact information is not provided with the incoming call and is not present in the local personal address book 274.

Referring again to FIG. 4, the incoming call screen 402 also includes an answer button 412 and ignore button 414. Highlighting and selecting the answer button 412 via respective user input (e.g., highlighting via the navigational tool and selecting the highlighted button by depressing the ENTER key or depressing the navigational tool) or depressing an answer key (not shown) of the mobile device 201 will answer the incoming call. Highlighting and selecting the ignore button 414 via respective user input or depressing an ignore key (not shown) of the mobile device 201 will ignore the incoming call.

In some embodiments, the incoming call information is added to a call log in the form of a call record/entry. The call record comprises the telephone number 406 and name 408, and possibly the extended contact information 410. The call record may be added when an incoming call is answered, missed or ignored. In some embodiments, outgoing calls may be added to the call log. The call records for outgoing calls may include the same type of information as for incoming calls. The call records in the call log, in at least some embodiments, expire after a predetermined duration such as after 30 days from the date the call occurred or the incoming call was received. The call log expiry conserves local memory on the mobile device 201. The predetermined duration is typically set so that any important call information will be added by the user to the personal address book 274 within the predetermined duration.

Figure 5:
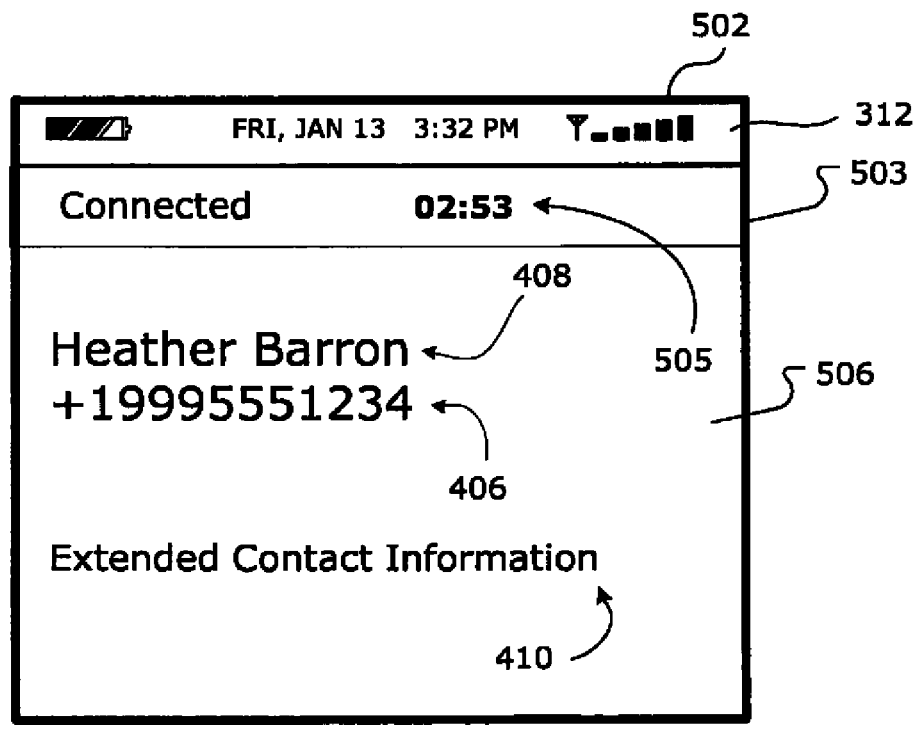
FIG. 5 illustrates a call-in-progress user interface screen for a phone application for a mobile device in accordance with one embodiment of the present disclosure.

FIG. 5 illustrates a call-in-progress user interface screen 502 for the phone application 270 on the mobile device 201 in accordance with one embodiment of the present disclosure. The call-in-progress screen 502 is displayed when an incoming call is answered from the incoming call screen 402. The call-in-progress screen 502 includes a notification field 503 which provides a notification that a call is in-progress and duration 505 of the call-in-progress. The call-in-progress screen 502 also includes a call information field 506 which includes a telephone number 406 (1-999-555-1234 in the shown screen) and a name 408 (Heather Barron in the shown screen) associated with the call-in-progress.

The incoming phone number 406 and name 408 displayed in the call information field 506 of the call-in-progress screen 502 are the same as that of the incoming call screen 402. In particular, the phone number 406 is the number previously obtained from the radio layer, and the name 408 is the name previously obtained from the radio layer or determined from the personal address book 274, global address book 134, or contact database 140. Extended contact information 410 associated with the respective contact and incoming phone number 406 may be displayed in the incoming call screen 402 in some embodiments. The extended contact information 410 may be displayed even if not previously displayed in the incoming call screen 402. The extended contact information 410 may be determined prior to the call being answered even if this information is not displayed in the incoming call screen 402. However, if the extended contact information 410 was not determined prior to the call being answered, it must be determined after the call is answered as described above if it is to be displayed in the call-in-progress screen 502.

It will be appreciated that other user interface elements may be displayed in the incoming call screen 402 and the call-in-progress screen 502 in other embodiments. For example, while not shown, the call-in-progress screen 502 may include a user interface element providing an indication of the current speaker volume and possibly a user interface element which provides the ability to adjust the speaker volume.

Figure 8:
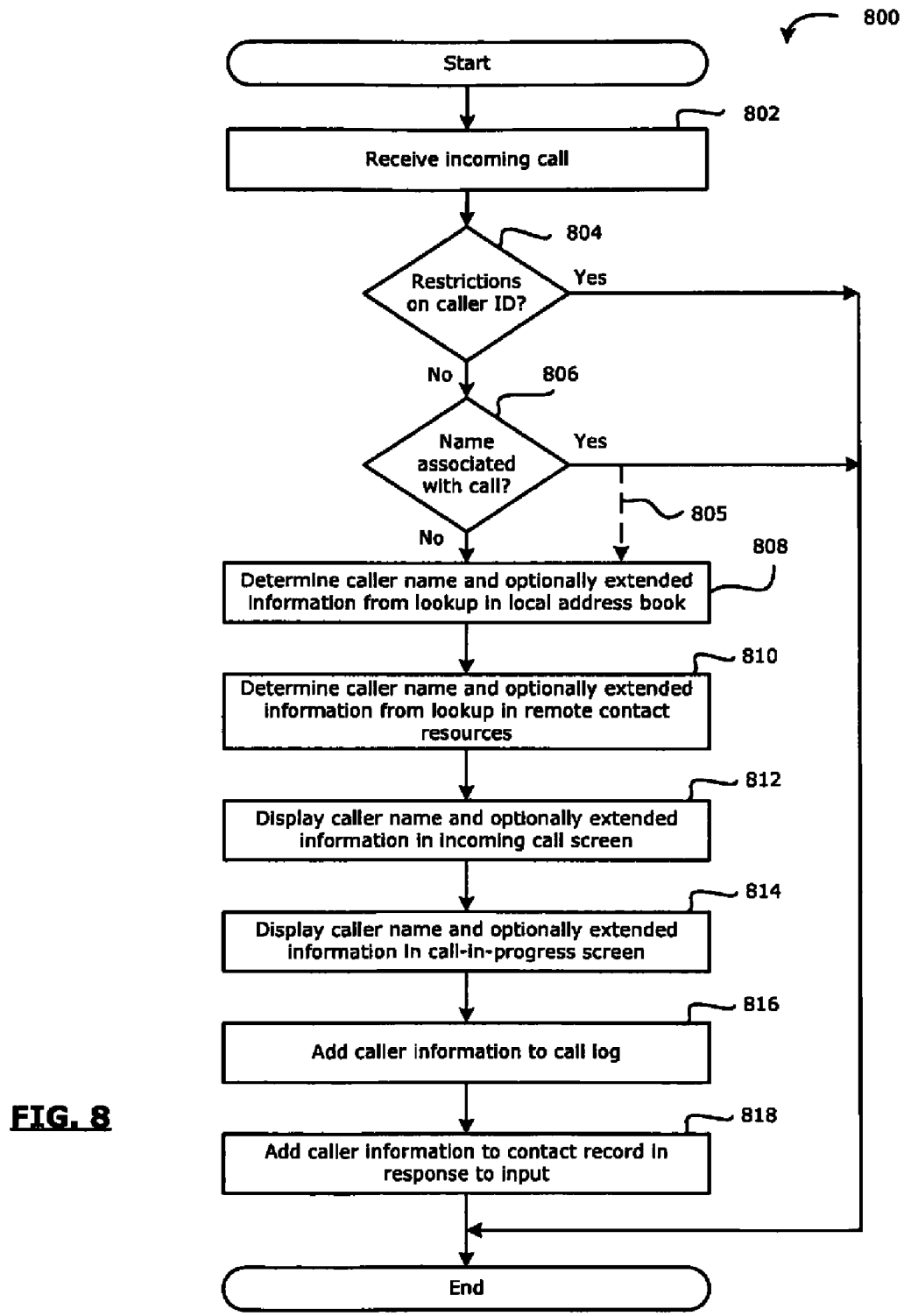
FIG. 8 is a flowchart illustrating example method of providing enhanced telephone call information for an incoming call in accordance with one example embodiment of the present disclosure.

Referring now to FIG. 8, an example method of providing enhanced telephone call information for an incoming call in accordance with one example embodiment of the present disclosure will be described. Operations 800 of the method are carried out by the processor 240 of the mobile device 201 under the instruction of the phone application module 270.

The phone application 270 receives an incoming call from a telephone number (step 802) of a calling phone which could be a landline or POTS phone, VOIP phone, wireless telephone or cellular telephone. Next, the phone application 270 determines whether caller ID blocking has been applied to the incoming call or other restrictions which prevent the phone application 270 from displaying the phone number and/or name associated with the incoming call (step 804). This step is typically performed by analysing information contained in the radio layer as would be understood by persons skilled in the art. If caller ID blocking has been applied to the incoming call or other restrictions which prevent the phone application 270, the operations 800 end. Otherwise, the operations continue to step 806.

Next, the phone application 270 determines whether a name is associated with the incoming call (step 806), typically by analysing information contained in the radio layer as would be understood by persons skilled in the art. If no name is associated with the incoming call, operations proceed to step 808. If a name is associated with the incoming call, the operations 800 end. In other embodiments, depending on predetermined settings applied by the phone application 270, typically stored in memory on the mobile device 201 or wireless connector system 120, operations 800 may proceed to step 806 where the name provided with the incoming call is to be replaced with, or supplemented by, contact information from other sources (optional step 805).

Next, a lookup operation of the local address book 274 is performed (step 808) to determine the name and optionally extended contact information.

Next, if the local address book 274 does not contact a contact record which matches the incoming phone number (or name in some embodiments, e.g., when the operations 800 proceed via step 805), a lookup operation of the remote contact sources (i.e., the global address book 134 and/or contact database 140) is performed (step 810) to determine the name and optionally extended contact information. As described, this step comprises the processor 240 instructing the messaging server 132 and/or directory service 138 to perform a lookup of the respective contact information stores. The instructions include at least the incoming phone number and possibly the name. Next, the remote contact sources perform a lookup operation using the incoming phone number and possibly the name as search terms. The remote contact sources then determine which contact records match the incoming phone number and possibly the name. Next, contact information from contact records in the global address book and/or contact database 140 which match the search criteria are returned to the mobile device 201. If contact information is available from more than one source, rules defining which contact information is to be used are applied by the processor 240.

One or more rules may be defined to resolve conflicts where contact information from more than one contact source exists. The rules may define: (i) a preference associated with the contact sources (e.g., personal address book, information provided with the incoming call, and remote contact sources in decreasing order of preference), (ii) the contact information from the contact record having the most recent/up-to-date contact information is to be used (which may, for example, be determined by comparing respective dates associated with the creation/revision/modification of the respective contact records), or (iii) the contact record having the most contact information is to be used. The rules for resolving conflicts are typically stored in the memory 244 of the mobile device 201.

In some embodiments, if there is any ambiguity as to which contact information should be used (e.g., for example, which contact information is the most recent), a window or dialog box may be displayed on the display screen 204 which prompts the user to confirm via corresponding input which contact information should be used (e.g., which contact information is the correct information or most up-to-date). The default may be that the closest match is displayed (based on name comparison) or that the most commonly used (based on a usage log maintained by the mobile device) is displayed. A preference setting may also be provided for the user to specify his or her preferences.

Next, the caller information (i.e., contact information) is displayed in an incoming call screen 402 on the display screen 402 (step 812). If the call is answered, the caller information is displayed in a call-in-progress screen 502 on the display screen 402 (step 815). In other embodiments, the caller information is displayed only in the call-in-progress screen 502.

Next, the caller information is optionally added to the call log (step 816). The caller information may be added to the call log regardless of whether the call is answered in some embodiments. This step is optional and need not be performed in all embodiments.

Next, the caller information is optionally added to the personal address book (step 818), typically in response to corresponding user input, such as causing a phone application menu to appear and selecting a menu item requesting the mobile device to add the contact to the personal address book 274. This step is optional and need not be performed in all embodiments.

It will be appreciated that the operations 800 are performed automatically by the processor 240 without any user input, with the possible exception of step 818 which may require user input to add the caller information to the personal address book 274 in some embodiments. However, input from settings may be used in determining whether some of the steps in the operations 800 are determined for a particular incoming call.

Figure 6:
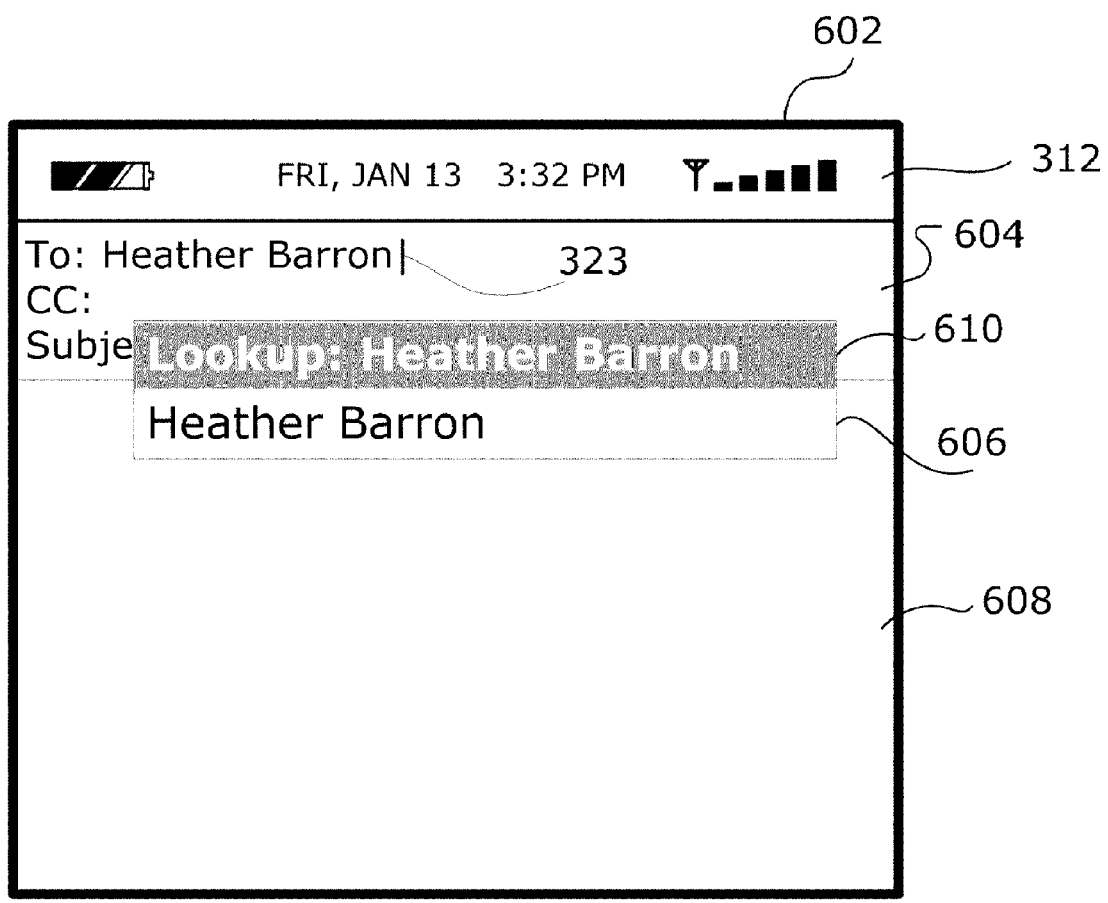
FIG. 6 illustrates an email composition user interface screen for an email application for a mobile device in accordance with one embodiment of the present disclosure.

FIG. 6 illustrates an email message composition user interface screen 602 for the email application 272 for the mobile device 201 in accordance with one embodiment of the present disclosure. The user interface screen 602 includes an address portion 604 including a "To" address field, "CC" address field and "Subject" field. A "BCC" address field (not shown) could also be included in other embodiments. The operation and use of such fields is known in the art and will not be described herein. The user interface screen 602 also includes a message body portion 608 for entry of a message. The user interface screen 602 is provided with a text cursor 323 which is navigable within and between the respective fields of the address portion 604, and between the address portion 604 and message body portion 608.

When one of the address fields is active, i.e. when one of the "To" "CC" or "BCC" fields is active, entry of an input causes the processor 240 to perform a local lookup operation of the input in the respective field to contact records in the personal address book 274 to determine if the input matches any contacts records. The lookup operation comprises comparing the input to one or more fields of the contact records. Typically, the fields used in comparison comprise at least the name field but may also comprise one or more of the company/organization field, title/department field, email address field or other text fields of the contact records in the personal address book 274. Typically, the results of the lookup operation are displayed in a pop-up window 606 adjacent to the address field which overlays a portion of the user interface screen 602. In other embodiments, the results could be integrated within the user interface screen 602 rather than displayed in a pop-up window 606.

The pop-up window 606 is populated with a list of contact names of the contact records which match the input in the address field. Additional information may be included with the name in some embodiments. The additional information may comprise an organization/business, a location associated with the contact record such as a street address, city, or city and state. In other embodiments, the pop-up window 606 may be populated with a list of email addresses of the contact records which match the input in the address field. The type and nature of the displayed information in the pop-up window 606 may be determined in accordance with predetermined settings.

The pop-up window 606 may also include a lookup field 610 similar to the lookup field 328. Alternatively, the lookup field 610 may be invoked from the screen 602, for example from the address field, by causing an email application menu to appear and selecting a corresponding menu item requesting the lookup field 610 to be displayed.

When activated/selected, for example in the manner described above in connection with the lookup field 328, the lookup field 610 performs a lookup on the global address book 134 and/or contact database 140 of the directory service 138 to find contact records which match the input in the address field. Upon receiving input to perform a lookup, the processor 240 instructs the messaging service 132 and/or directory service 138 and requests the lookup field input be compared to the contact records in the global address book 134 and/or contact database 140 as the case may be, determines which contact records match the lookup field input, and returns contact information to the mobile device 201 about the contact records that match the lookup field input. The comparison may be based on one or more of the fields of the contact records in the global address book 134 and/or contact database 140. The comparison is typically based on at least the name field of the contact records, but could also be performed on other fields of the contact records such as organization.

Figure 9:
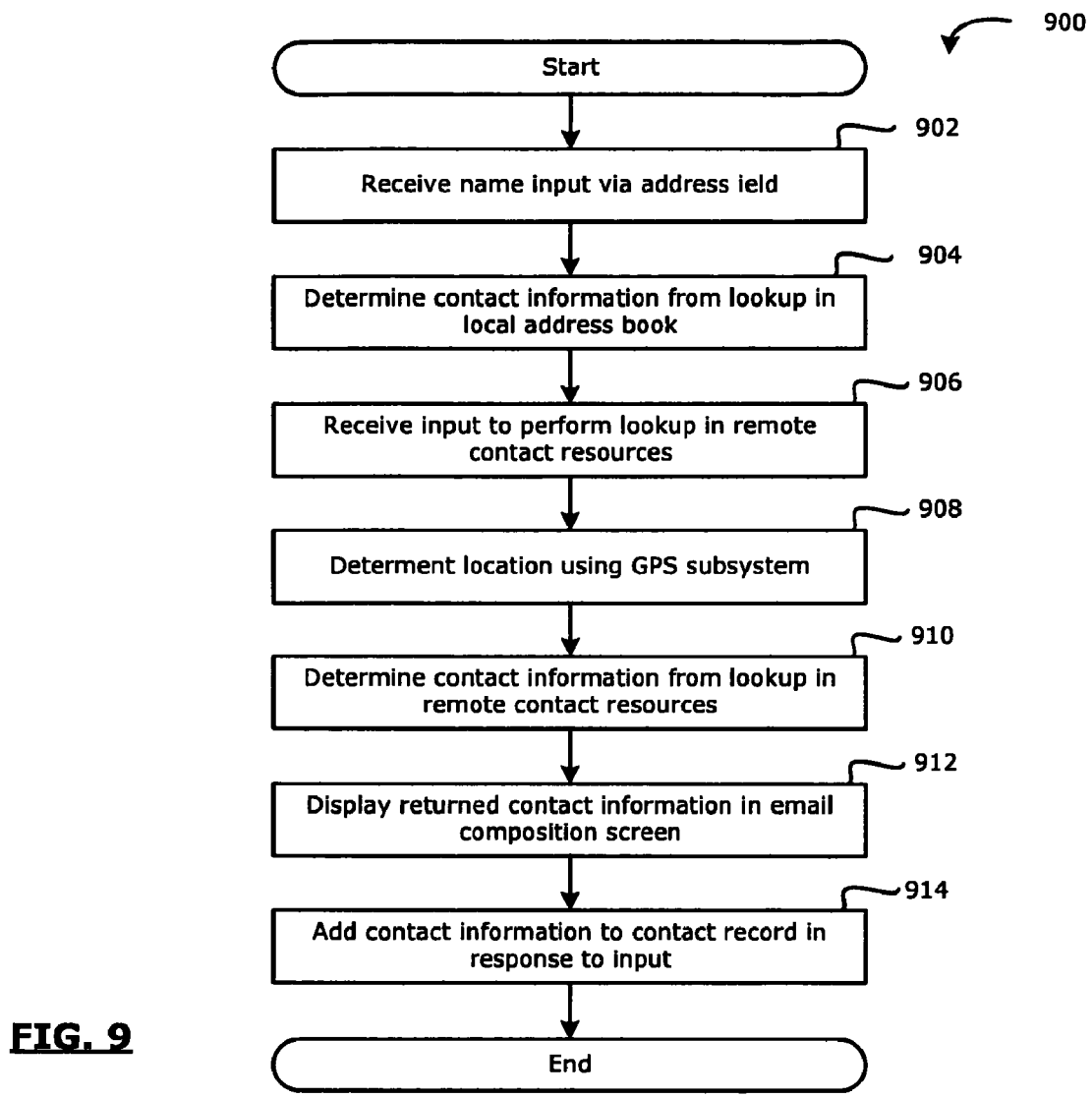
FIG. 9 is a flowchart illustrating example method of providing enhanced email information in accordance with one example embodiment of the present disclosure.

Referring now to FIG. 9, an example method of providing enhanced email information in accordance with one example embodiment of the present disclosure will be described. Operations 900 of the method are carried out by the processor 240 of the mobile device 201 under the instruction of the email application module 272. The message composition screen 602 shown above is the default screen of the email application 272.

In the first step 902, the email application 272 receives an input in an address field (e.g., To, CC or BCC field) in the address portion 604 of the screen 602 via respective input via one or more input devices. Next, the processor 240 performs a local lookup operation of the personal address book 274 (step 904) using the input in the address field as the search term. The contact information about contact records in the personal address book 274 which match the search term are then displayed in a pop-up window 606 (step 906), or possibly within the address field (for example, if there is only one matching record).

Next, the email application 272 receives an input request to perform a remote lookup operation on the input of the address field 328 (step 906). Optionally, in some embodiments, if the mobile device 201 has a GPS subsystem the mobile device 201 determines its current location using the GPS subsystem (step 908).

Next, a lookup operation of the remote contact sources (i.e., the global address book 134 and/or contact database 140) is performed (step 910). As described, this step comprises the processor 240 instructing the messaging server 132 and/or directory service 138 to perform a lookup of the respective contact information stores. The instructions include at least the input in the lookup field 610 as the basis for the search/lookup. If the mobile device 201 has a GPS subsystem and the mobile device 201 determined its current location using the GPS subsystem in step 908, the instructions also include the location information. Other sources of location information such as triangulation via base stations 108 or location services may be used in other embodiments.

Next, the remote contact sources, i.e. the messaging server 132 and/or directory service 138, perform a lookup operation using the lookup field input and optionally location information as search terms. The remote contact sources then determine which contact records match the lookup field input and optionally location information. Next, contact information from contact records in the global address book and/or contact database 140 which match the search criteria are returned to the mobile device 201. The returned contact information is then displayed in the pop-up window 606 or possibly address field. The returned contact information may be displayed with the contact names of contact records from the personal address book 274 (step 912) which match the input in the address field. If contact information is available from more than one source, rules defining which contact information is to be used are applied by the processor 240.

The user can then add further contacts in one or more address fields, add a subject in the subject field, and add a message body in the body portion 608 in the normal way. Further contact names can be looked up in the same manner as described above. After the completion of the message composition, the device user can send the message to the selected recipients (contacts) specified in the address field(s) using the wireless network 101 in the normal way. The device user could also at any time select to save the message as a draft (in at least some embodiments), or possibly cancel the message composition and discard the input data and any contact information which was obtained from the lookup operations.

Next, the contact information is optionally added to the personal address book 274 (step 914), typically in response to corresponding user input, such as causing an email application menu to appear and selecting a menu item requesting the mobile device to add the contact to the personal address book 274. This step is optional and need not be performed in all embodiments.

It will be appreciated that in the operations 900 contact information is only returned to the email application 272 when an email address is defined for a contact record regardless of whether other contact information such as the contact name matches the search terms used in the lookup. This applies to both local lookup operations and remote lookup operations.

While the operations 700, 800 and 900 have been described as occurring in a particular order, it will be appreciated to persons skilled in the art that some of the steps may be performed in a different order provided that the result of the changed order of any given step will not prevent or impair the occurrence of subsequent steps. For example, the contact information may be added to the personal address book 274 at any time after it has been returned to the mobile device 201. Furthermore, some of the steps described above may be combined in other embodiments, and some of the steps described above may be separated into a number of sub-steps in other embodiments.

While the operations 700, 800 and 900 have been described as being performed by the phone application 270 or email application 272, the integrated lookup field described herein can be applied to the contact input field of any communication application (e.g., any voice or text-based communication). For example, the integrated lookup field could be used for text messaging (e.g., SMS or MMS), instant messaging (IM), and chats or conversations, or in the contact input/edit fields of the personal address book 274. Accordingly, the present disclosure also provides a method of providing enhanced contact information on an electronic device, comprising: displaying a user interface screen of an application on a display screen of the electronic device, the user interface screen including a contact input field; receiving input via the contact input field; determining if a contact name in an address book stored in a memory of the device matches the input in the contact input field; determining if a contact name in a remote contact source matches the input in the contact input field; and displaying one or more contact names which match the input in the user interface screen.

The electronic device may be a mobile communication device such as a handheld communication device. The user interface screen may be for a communication application which, in some embodiments, could be a text messaging application for sending SMS, MMS or other text messages, an IM application, chat application, or a personal address book. In some embodiments, the input in the contact input field is compared automatically to the personal address book and/or the remote contact source to identify any matching contacts without user input. In some embodiments, the input in the contact input field is compared automatically to the personal address book without user input; however, corresponding input is required to compare the input in the contact input field to the remote contact source to identify any matching contacts.

In some embodiments, the application is an email messaging application, the user interface screen being an email composition user interface screen and the contact input field being the address field of the email composition user interface screen, wherein the remote contact source is only checked to determine if any contact names match the input in the contact input field in response to respective input. In some embodiments, the identified contact names are displayed together in a pop-up window which overlays at least a portion of the email composition user interface. In some embodiments, the remote contact source is a directory service. In some embodiments, two or more remote contact sources are searched, the remote contact sources comprising (i) a global address book of a messaging server of a wireless connector system associated with the device and (ii) a directory service.

While the operations 700, 800 and 900 have been described as being performed by the phone application 270 or email application 272, the local aspects of the lookup operations of these methods may be performed by a separate lookup module (not shown) stored in memory of the device 201 while the other aspects of the method may be performed by the phone application 270 or email application 272, as the case may be. The lookup module may be part of the operating system 223 in some embodiments. Moreover, a single lookup module may be used by the operations 700, 800 and 900 in some embodiments; in particular, a single lookup module may be used by both the phone application 270 and email application 272. In such embodiments, the lookup module provides centralized lookup capabilities for contact information for the mobile device 201. This may increase computational efficiency by reducing the processing required by the device 201, at least in part, by delegating responsibilities to aspects of the device software which are below the application level, such as to the operating system 223.

While reference has been to example user interface screens, it will be appreciated that additional fields and content may be added to the illustrated and described user interface screens in other embodiments of the present disclosure. Such modifications are intended to be within the scope of the present disclosure.

While directory services such as forward and reverse lookup services are known, these services have not been integrated with the functionality of a phone application to provide enhanced telephone call information, or an email application to provide enhanced email information. Known prior art solutions require the user to exit the respective application, open an Internet browser, access a directory service by the browser, search for the desired contact information, review the search results and determine which records are relevant, record the relevant contact information or commit it to memory (which could be contact information for more than one individual or business), and re-open the application, and then enter the information in the respective phone or email application. This solution is time consuming and requires many more steps and much more processing by the processor of the mobile device. In addition, this solution requires the user to record the relevant contact information (typically on paper) or commit it to memory. This causes inconvenience on the part of the user and creates the possibility that the contact information may be lost, forgotten, or improperly recorded. Further still, this solution does not present the user with any option to identity a user of an incoming call.

While some mobile devices, such as GSM and CDMA enabled mobile phones, can send name information with incoming calls, this feature is a "pay service" which has an associated fee charged by the respective wireless and landline carriers of the incoming telephone number. The present disclosure provides a solution which can be used with all wireless voice networks as the contact information is obtained by accessing contact resources available over a wireless data network rather than relying on information contained in the radio layer (which may be missing, incorrect or incomplete), and which may be used to verify and/or supplement the information which is available via the radio layer and personal address book.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A method of providing enhanced phone call information on a mobile communication device configured for voice and data communications, comprising:
   receiving an incoming call on the device;
   identifying a contact name in an address book stored in a memory of the device in accordance with a phone num- ber associated with the incoming call when the contact name is not provided with the incoming call;
identifying a contact name in a remote contact source over a wireless data network in accordance with a phone number associated with the incoming call when the contact name is not provided with the incoming call and not found in the address book stored in a memory of the device; and
displaying the identified contact name in a user interface screen on a display screen of the device;
wherein two or more remote contact sources are searched when identifying a contact name not provided with the incoming call and not found in the address book stored in the memory of the device, the remote contact sources comprising (i) a global address book of a messaging server associated with the device and (ii) a reverse lookup directory service.

2. The method of claim 1, wherein when multiple contact names are identified in the remote contact source, the displayed contact name is selected from the multiple contact names in accordance with a predetermined rule.

3. The method of claim 1, wherein the phone number associated with the incoming call is displayed in the user interface screen on the display screen with the contact name.

4. The method of claim 1, wherein the user interface screen is an incoming call screen.

5. The method of claim 1, further comprising:
answering the incoming call in response to respective input; and
displaying the contact name in a call-in-progress user interface screen on the display screen of the device.

6. The method of claim 5, wherein the phone number associated with the incoming call is displayed in the call-in-progress user interface screen on the display screen with the contact name.

7. The method of claim 1, wherein the remote contact source is a reverse lookup directory service.

8. The method of claim 1, wherein the contact name is identified when use of the phone number associated with the incoming phone call is not restricted.

9. The method of claim 1, wherein when contact names are available from more than one contact source, the displayed contact name is selected in accordance with a predetermined rule for resolving conflicts.

10. The method of claim 9, wherein the predetermined rule defines a preference associated with the more than one contact source.

11. The method of claim 9, wherein the predetermined rule is to select the contact name from the contact source having the most recent contact information.

12. The method of claim 9, wherein the predetermined rule is to select the contact name from the contact source having the most contact information.

13. A method of providing enhanced phone call information on a mobile communication device configured for voice and data communications, comprising:
displaying a dialing user interface screen on a display screen of the device, the dialing screen including a dialing field;
receiving input via the dialing field;
determining if a contact name in an address book stored in a memory of the device matches the input in the dialing field;
determining over a wireless data network if a contact name in a remote contact source matches the input in the dialing field in response to respective input; and
displaying one or more contact names which match the input in the dialing user interface screen.

14. The method of claim 13, wherein the contact names are displayed together in a contact window of the dialing user interface screen.

15. The method of claim 13, wherein the remote contact source is a directory service.

16. The method of claim 13, wherein two or more remote contact sources are searched, the remote contact sources comprising (i) a global address book of a messaging server of a wireless connector system associated with the device and (ii) a directory service.

17. The method of claim 13, further comprising:
selecting a contact from the dialing user interface screen in response to respective input;
initiating an outbound call to a telephone number associated with the selected contact name from the dialing user interface screen in response to respective input; and
displaying the contact name in a calling user interface screen on the display screen of the device.

18. The method of claim 17, wherein the phone number associated with the incoming call is displayed in the calling interface screen on the display screen with the contact name.

19. A method of providing enhanced contact information on a mobile communication device, comprising:
displaying a user interface screen of a text messaging application or emailing application on a display screen of the electronic device, the user interface screen including a contact input field;
receiving input via the contact input field;
determining if a contact name in an address book stored in a memory of the device matches the input in the contact input field;
determining over a wireless data network if a contact name in a remote contact source matches the input in the contact input field; and
displaying one or more contact names which match the input in the user interface screen;
wherein two or more remote contact sources are searched when identifying a contact name not provided with the incoming call and not found in the address book stored in the memory of the device, the remote contact sources comprising (i) a global address book of a messaging server associated with the device and (ii) a reverse lookup directory service.

20. The method of claim 19, wherein the application is an email messaging application, the user interface screen being an email composition user interface screen and the contact input field being an address field of the email composition user interface screen, wherein the remote contact source is only checked to determine if any contact names match the input in the contact input field in response to respective input.

21. The method of claim 20, wherein the contact names are displayed together in a pop-up window which overlays at least a portion of the email composition user interface.

22. The method of claim 20, wherein the remote contact source is a directory service.

23. The method of claim 20, wherein two or more remote contact sources are searched, the remote contact sources comprising (i) a global address book of a messaging server of a wireless connector system associated with the device and (ii) a directory service.

24. A mobile communication device, comprising:
a controller for controlling the operation of the device;
a display screen connected to the controller;

a communication subsystem connected to the controller configured for data and voice communication with a wireless network;

one or more input devices connected to the controller;

the controller being configured to: receive an incoming call on the device; identify accordance with a phone number associated with the incoming call when the contact name is not provided with the incoming call; identify a contact name in a remote contact source over a wireless data network in accordance with a phone number associated with the incoming call when the contact name is not provided with the incoming call and not found in the address book stored in a memory of the device; and display the identified contact name in a user interface screen on the display screen of the device;

wherein two or more remote contact sources are searched when identifying a contact name not provided with the incoming call and not found in the address book stored in the memory of the device, the remote contact sources comprising (i) a global address book of a messaging server associated with the device and (ii) a reverse lookup directory service.

* * * * *

UNITED STATES PATENT AND TRADEMARK OFFICE
CERTIFICATE OF CORRECTION

PATENT NO. : 8,135,391 B2
APPLICATION NO. : 12/366745
DATED : March 13, 2012
INVENTOR(S) : Sherryl Lee Lorraine Scott and Lawrence Edward Kuhl It is certified that error appears in the above-identified patent and that said Letters Patent is hereby corrected as shown below:

In the Claims:

At column 29, line 6, "identify accordance with a phone number" should read "identify a contact name in an address book stored in a memory of the device in accordance with a phone number".

Signed and Sealed this
Eleventh Day of June, 2013

Teresa Stanek Rea
*Acting Director of the United States Patent and Trademark Office*